United States Patent
Li et al.

(10) Patent No.: US 12,277,747 B2
(45) Date of Patent: Apr. 15, 2025

(54) METHOD AND APPARATUS FOR IMAGE PROCESSING AND IMAGE SYNTHESIS FOR OBTAINING A TARGET FACE IMAGE, AND COMPUTER-READABLE STORAGE MEDIUM

(71) Applicant: Tencent Technology (Shenzhen) Company Limited, Shenzhen (CN)

(72) Inventors: Xiaoyi Li, Shenzhen (CN); Mengren Qian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 17/835,817

(22) Filed: Jun. 8, 2022

(65) Prior Publication Data

US 2022/0301284 A1 Sep. 22, 2022

Related U.S. Application Data

(63) Continuation of application No. PCT/CN2021/088641, filed on Apr. 21, 2021.

(30) Foreign Application Priority Data

Jun. 1, 2020 (CN) .......................... 202010486646.0

(51) Int. Cl.
*G06T 7/73* (2017.01)
*G06T 7/50* (2017.01)
(Continued)

(52) U.S. Cl.
CPC .............. *G06V 10/757* (2022.01); *G06T 7/50* (2017.01); *G06T 7/62* (2017.01); *G06T 7/74* (2017.01);
(Continued)

(58) Field of Classification Search
CPC .. G06V 40/171; G06V 40/165; G06V 40/168; G06V 40/16
See application file for complete search history.

(56) References Cited

U.S. PATENT DOCUMENTS

2017/0154461 A1 6/2017 Rhee et al.
2019/0335098 A1* 10/2019 Guo .......................... H04N 5/33
(Continued)

FOREIGN PATENT DOCUMENTS

CN 107481317 A 12/2017
CN 109685915 A 4/2019
(Continued)

OTHER PUBLICATIONS

Tencent Technology, ISR, PCT/CN2021/088641, Jul. 21, 2021, 2 pgs.

(Continued)

*Primary Examiner* — Guillermo M Rivera-Martinez
(74) *Attorney, Agent, or Firm* — Morgan, Lewis & Bockius LLP

(57) ABSTRACT

This application discloses an image processing method performed by a computer device. In this embodiment of this application, feature point recognition can be performed on a face image to obtain a plurality of facial feature points of the face image; feature point position offset information between the feature points and reference facial feature points of a reference face image is determined; based on the feature point position offset information, position adjustment is performed on a facial feature point of a reference face depth image corresponding to the reference face image to obtain a target face depth image corresponding to the face image; and direction deflection is performed on the face image according to the target face depth image to obtain a target face image.

20 Claims, 13 Drawing Sheets

(51) Int. Cl.
  *G06T 7/62* (2017.01)
  *G06V 10/22* (2022.01)
  *G06V 10/40* (2022.01)
  *G06V 10/75* (2022.01)
  *G06V 10/80* (2022.01)
  *G06V 40/18* (2022.01)

(52) U.S. Cl.
  CPC .............. *G06V 10/22* (2022.01); *G06V 10/40* (2022.01); *G06V 10/7515* (2022.01); *G06V 10/806* (2022.01); *G06V 40/193* (2022.01); *G06T 2207/10012* (2013.01); *G06T 2207/20068* (2013.01); *G06T 2207/20081* (2013.01); *G06T 2207/20221* (2013.01); *G06T 2207/30201* (2013.01)

(56) References Cited

U.S. PATENT DOCUMENTS

| | | | |
|---|---|---|---|
| 2020/0151425 A1* | 5/2020 | Zhou | G06V 40/45 |
| 2020/0258206 A1 | 8/2020 | Shen et al. | |

FOREIGN PATENT DOCUMENTS

| | | |
|---|---|---|
| CN | 109886144 A | 6/2019 |
| CN | 110163054 A | 8/2019 |
| CN | 110189248 A | 9/2019 |
| CN | 110852310 A | 2/2020 |
| CN | 111652123 A | 9/2020 |
| WO | WO 2013189101 A1 | 12/2013 |
| WO | WO 2019000462 A1 | 1/2019 |
| WO | WO 2019101113 A1 | 5/2019 |
| WO | WO 2020019904 A1 | 1/2020 |

OTHER PUBLICATIONS

Dalong Jiang et al., "Efficient 3D Reconstruction for Face Recognition", Pattern Recognition, Elsevier, vol. 38, Vo. 6, Jun. 1, 2005, XP004777882, 12 pgs.
Tencent Technology, Extended European Search Report and Supplementary Search Report, EP21817189.0, Nov. 24, 2022, 13 pgs.
Tencent Technology, WO, PCT/CN2021/088641, Jul. 21, 2021, 6 pgs.
Tencent Technology, IPRP, PCT/CN2021/088641, Dec. 6, 2022, 7 pgs.
Tencent Technology, Indian Office Action, IN Patent Application No. 202247033273, Feb. 1, 2023, 6 pgs.

* cited by examiner

METHOD AND APPARATUS FOR IMAGE PROCESSING AND IMAGE SYNTHESIS FOR OBTAINING A TARGET FACE IMAGE, AND COMPUTER-READABLE STORAGE MEDIUM

CROSS-REFERENCE TO RELATED APPLICATIONS

This application is a continuation application of PCT Patent Application No. PCT/CN2021/088641, entitled "IMAGE PROCESSING METHOD AND IMAGE SYNTHESIS METHOD, IMAGE PROCESSING APPARATUS AND IMAGE SYNTHESIS APPARATUS, AND STORAGE MEDIUM" filed on Apr. 21, 2021, which claims priority to Chinese Patent Application No. 202010486646.0, filed with the State Intellectual Property Office of the People's Republic of China on Jun. 1, 2020, and entitled "METHOD AND APPARATUS FOR IMAGE PROCESSING AND IMAGE SYNTHESIS, AND COMPUTER-READABLE STORAGE MEDIUM", all of which are incorporated herein by reference in their entirety.

FIELD OF THE TECHNOLOGY

This application relates to the field of image processing, and specifically, to a method and apparatus for image processing and image synthesis, and a computer-readable storage medium.

BACKGROUND OF THE DISCLOSURE

Some image processing applications can provide a user with some image processing functions. For example, face images from different angles can be generated according to a front face image uploaded by the user. Currently, a 3D facial reconstruction technology is applied in an image processing application to generate a 3D model according to the front face image uploaded by the user, and then obtain face images from different angles according to the model. However, the manner requires the creation and intervention of a high-precision 3D model, and requires a deformable 3D model to dynamically match a facial angle, and the ratio between a face and facial features of the user. In addition, a large quantity of 3D implementation development is required. Therefore, a technical architecture of an applied product is complicated, thereby affecting a speed of image processing.

SUMMARY

Embodiments of this application provide a method and an apparatus for image processing and image synthesis, and a computer-readable storage medium, which can simply and conveniently deflect a to-be-processed face image to a target direction.

An embodiment of this application provides an image processing method performed by an electronic device, the method including:
  obtaining a to-be-processed face image;
  performing feature point recognition on the face image to obtain a plurality of facial feature points of the face image;
  determining feature point position offset information between the facial feature points and reference facial feature points of a reference face image;
  performing, based on the feature point position offset information, position adjustment on a facial feature point of a reference face depth image corresponding to the reference face image to obtain a target face depth image corresponding to the face image; and
  performing direction deflection on the face image according to the target face depth image to obtain a target face image.

Correspondingly, an embodiment of this application further provides an image synthesis method, performed by an electronic device, the method including:
  obtaining a to-be-processed face image;
  obtaining a target face image according to the face image, the target face image being obtained by processing of the image processing method; and
  fusing the target face image to a face region in a template image to obtain a target image.

An embodiment of this application further provides a computer device comprising a processor and a memory, the memory being configured to store a plurality of instructions, and the processor being configured to execute the plurality of instructions to perform the operations in any image processing method or image synthesis method according to the embodiments of this application.

An embodiment of this application further provides a non-transitory computer-readable storage medium, storing a plurality of instructions, the instructions being adapted to be loaded by a processor of a computer device, causing the computer device to perform the operations in any image processing method or image synthesis method according to the embodiments of this application.

In this embodiments of this application, feature point recognition is performed on a face image to obtain a plurality of facial feature points of the face image; feature point position offset information between the facial feature points and a plurality of reference facial feature points of a reference face image is determined; based on the feature point position offset information, position adjustment is performed on a facial feature point of a reference face depth image to obtain a target face depth image corresponding to the face image, the reference face depth image being a face depth image corresponding to the reference face image; and direction deflection is performed on the face image according to the target face depth image to obtain a target face image. Therefore, the solution can simply and conveniently deflect a face image to a target direction.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Embodiments of this application provide a method and an apparatus for image processing and image synthesis, and a computer-readable storage medium.

The image processing apparatus may be specifically integrated into an electronic device. The electronic device may be a terminal, a server, or the like. The terminal may be a device such as a mobile phone, a tablet computer, an intelligent Bluetooth device, a notebook computer, or a personal computer (PC); and the server may be a single server or a server cluster including a plurality of servers.

In some embodiments, the image processing apparatus may further be integrated into a plurality of electronic devices. For example, the image processing apparatus may be integrated into a plurality of servers, and the image processing method of this application may be implemented by a plurality of servers. In some embodiments, the image processing can also be implemented in the form of a terminal.

Figure 1A:
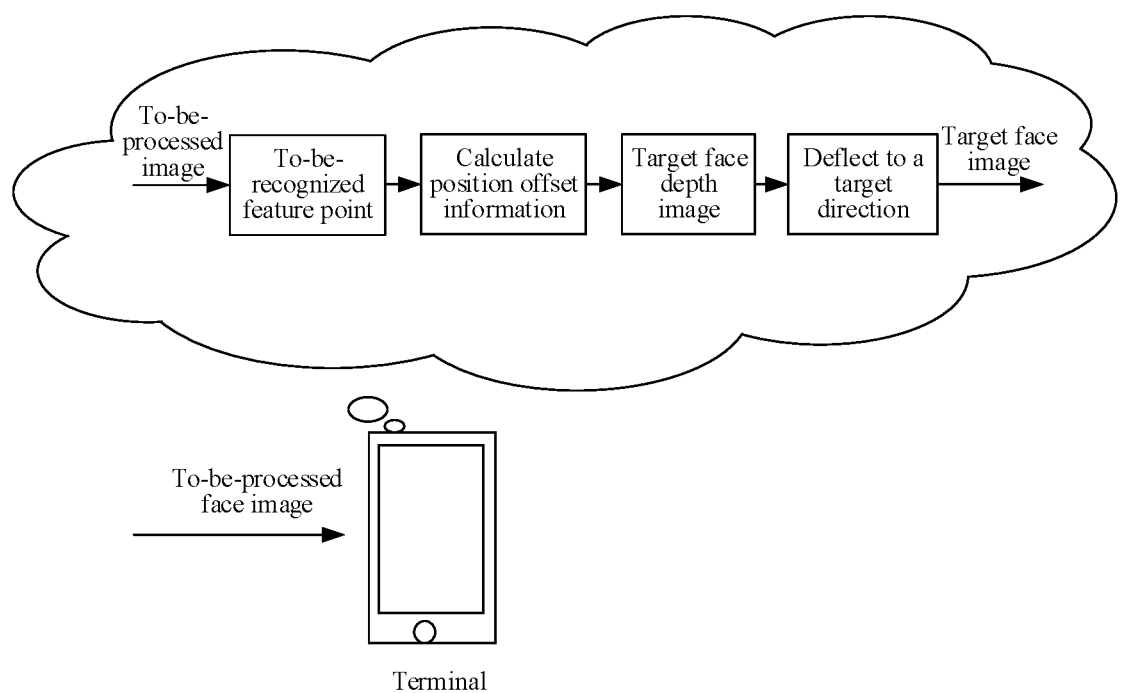
FIG. 1A is a schematic diagram of a scenario of an image processing method according to an embodiment of this application.

For example, referring to FIG. 1A, the electronic device can obtain a to-be-processed face image; feature point recognition is performed on the face image to obtain a plurality of facial feature points of the face image; feature point position offset information between the facial feature points and a plurality of reference facial feature points of a reference face image is determined; based on the feature point position offset information, position adjustment is performed on a facial feature point of a reference face depth image to obtain a target face depth image corresponding to the face image, the reference face depth image being a face depth image corresponding to the reference face image; and direction deflection is performed on the face image according to the target face depth image to obtain a target face image. Therefore, the solution can simply and conveniently deflect a face image to a target direction.

Correspondingly, the image synthesis apparatus may be specifically integrated into an electronic device. The electronic device may be a terminal, a server, or the like. The terminal may be a device such as a mobile phone, a tablet computer, an intelligent Bluetooth device, a notebook computer, or a personal computer (PC); and the server may be a single server or a server cluster including a plurality of servers.

In some embodiments, the image synthesis apparatus may further be integrated into a plurality of electronic devices. For example, the image synthesis apparatus may be integrated into a plurality of servers, and the image synthesis method of this application may be implemented by a plurality of servers. In some embodiments, the image synthesis can also be implemented in the form of a terminal.

Figure 1B:
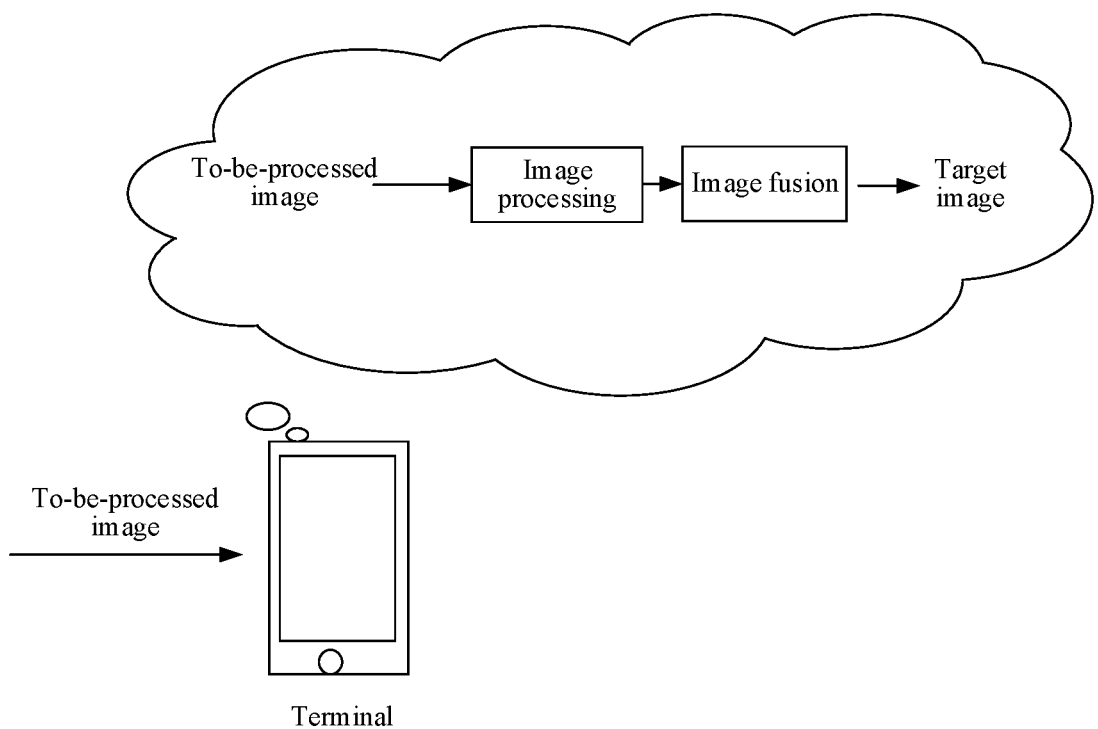
FIG. 1B is a schematic diagram of a scenario of an image synthesis method according to an embodiment of this application.

Referring to FIG. 1B, the electronic device can obtain a to-be-processed face image; a target face image is obtained according to the face image, and the target face image is fused to a face region in a template image to obtain a target image. In the solution, a face image uploaded by the user can be fused with a template image in different directions, that is, the user only needs to upload one to-be-processed face image, and then a plurality of target images from different angles can be synthesized, thereby improving the playability and practicability of image synthesis.

Detailed descriptions are separately performed below. Sequence numbers of the following embodiments are not intended to limit preference orders of the embodiments.

Figure 2A:
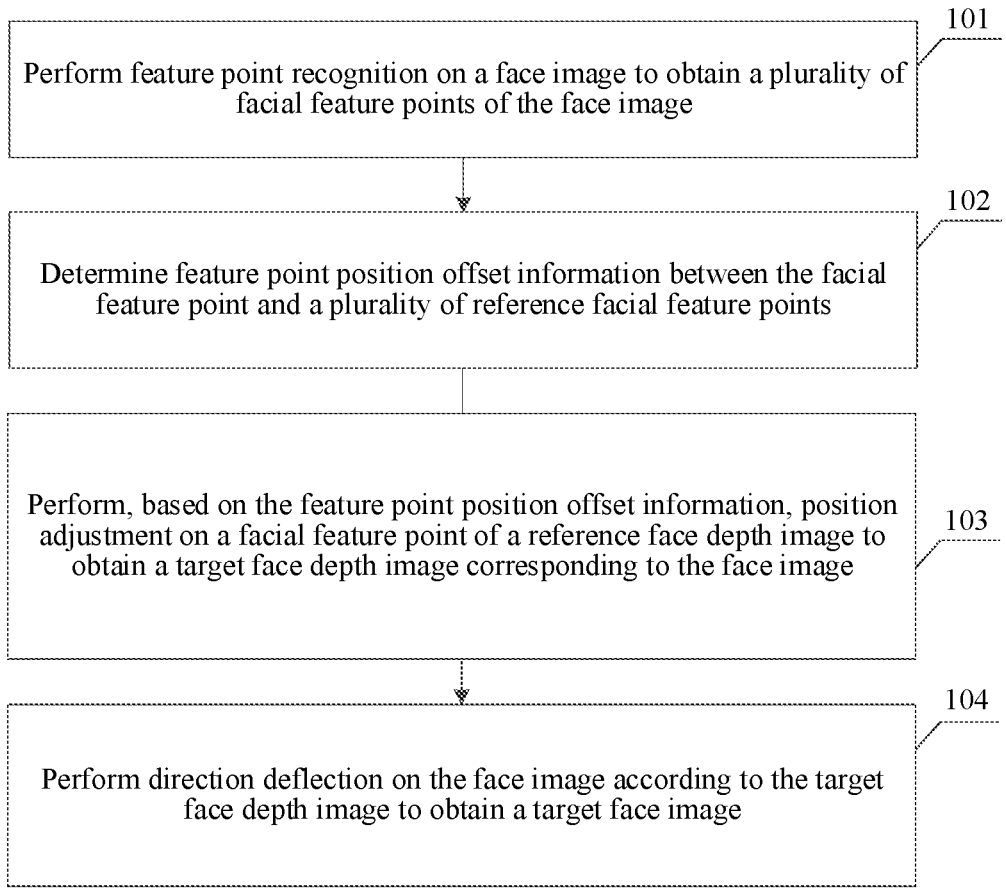
FIG. 2A is a schematic flowchart of an image processing method according to an embodiment of this application.

In this embodiment, an image processing method is provided. As shown in FIG. 2A, the image processing method may include the following specific steps.

Feature point recognition is performed on the to-be-processed face image to obtain a to-be-processed facial feature point.

The to-be-processed face image refers to a face region of the to-be-processed image uploaded by the user.

In an embodiment, the terminal can take the following steps to obtain a to-be-processed image.

The to-be-processed image is obtained; and when a direction of a face region in the to-be-processed image is a preset direction, the face region is divided from the to-be-processed image as a to-be-processed face image.

The preset direction is a direction where the face region in a reference face image is located. For the convenience of application, the preset direction is generally set as forward. That is, a plane where a coronal line of a head of an image is located is parallel to a plane where the image is located.

The reference face image is a preset standard face image. The standard face can be obtained by fusing a large quantity of face images.

In an embodiment, an image processing page can be displayed in the terminal, and the user can perform an operation on the image processing page to obtain the to-be-processed image. For example, the image processing page is provided with a control for obtaining pictures, and the control is an instruction interface for obtaining the to-be-processed image, and can be expressed in various forms such as a button and an icon. When the user clicks on the control, the terminal receives an instruction to obtain a picture, and obtains the to-be-processed image according to the instruction.

In an embodiment, the terminal can turn on a camera based on the instruction and display a shooting page to obtain the to-be-processed image based on an operation performed by the user on the shooting page. In another embodiment, the terminal may further obtain, based on the instruction, a picture stored in a terminal memory, and determine, based on a selection operation performed by the user, the to-be-processed image from the terminal memory.

Figure 5A:
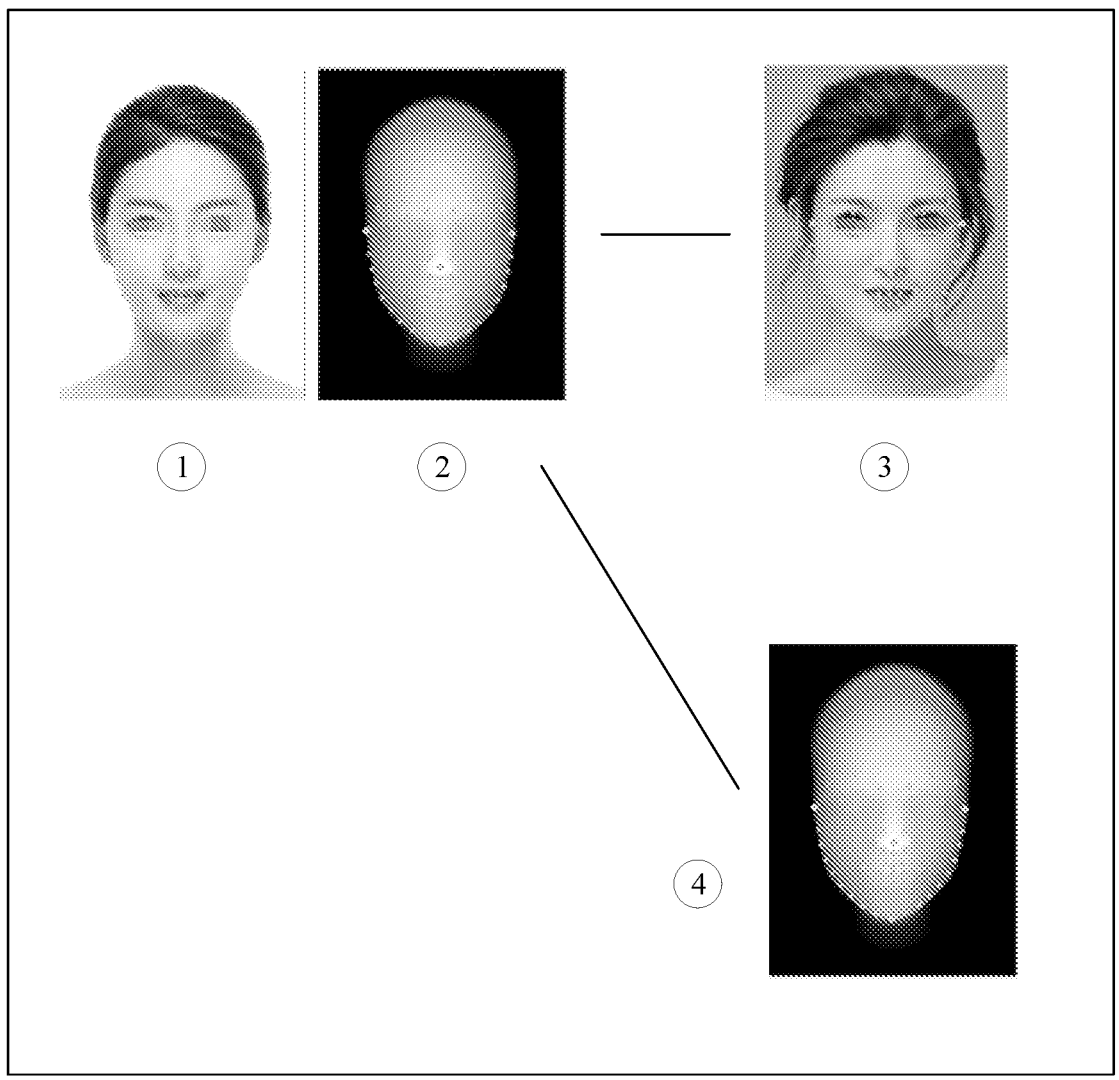
FIG. 5A is a schematic flowchart of a target depth image generation of an image processing method according to an embodiment of this application.
Figure 5B:
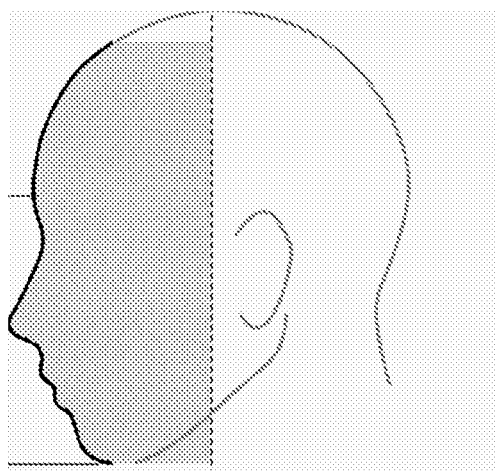
FIG. 5B is a schematic diagram of a reference depth relationship of an image processing method according to an embodiment of this application.
Figure 5C:
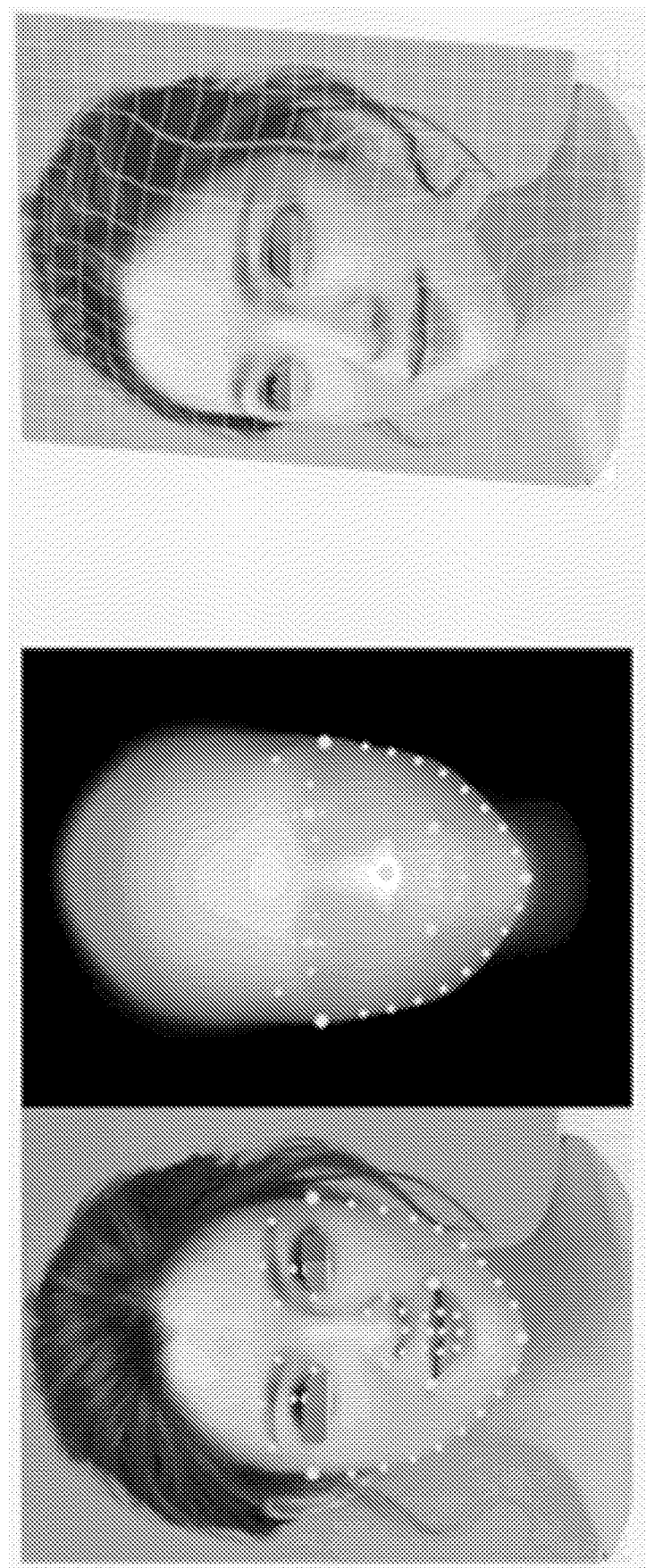
FIG. 5C is a schematic diagram of image deflection of an image processing method according to an embodiment of this application.
Figure 5D:
FIG. 5D is a schematic diagram of facial direction correction of an image processing method according to an embodiment of this application.

In an embodiment, referring to FIG. 5D, when the direction of the face region in the to-be-processed image is not the preset direction, a face region image can be divided from the to-be-processed image; and the face region image is deflected to the preset direction to obtain a to-be-processed face image according to the reference face image, where reference can be made to embodiments 102 to 105 for the method used for deflecting the face region image to the preset direction, and details are not repeated herein.

A facial feature point can be a point that reflects an essential feature of a facial portion (such as facial features), for example, can include facial feature points such as a facial contour feature point, an eye feature point (such as a left eye feature point, a right eye feature point, a pupil feature point), an eyebrow feature point (such as a left eyebrow feature point, a right eyebrow feature point), a mouth feature point, a nose feature point, and the like.

There are various manners to recognize the facial feature point. For example, the facial feature point can be recognized based on a deep learning network model. In another example, feature point recognition can be performed on the face image based on a trained facial feature network recognition model, and the facial feature network recognition model can be served as a model based on a convolutional neural network.

Before the facial feature network recognition model is used, the facial feature network recognition model needs to be trained by using a large quantity of sample face images.

The facial feature network recognition model involves artificial intelligence (AI), which is a technology that simulates human in perception of environment, acquisition of knowledge, and use of knowledge by using a digital computer. The technology can enable a machine to have human-like functions such as perception, reasoning, and decision-making. An AI technology mainly includes fields such as a computer vision (CV) technology, a speech processing technology, a natural language processing technology, and machine learning/deep learning (DL).

The CV is a technology that replaces human eyes by using a computer to recognize, measure, and further process the to-be-processed image. The CV technologies generally include technologies such as image processing, image recognition, image semantic understanding, image retrieval, virtual reality, augmented reality, synchronous positioning, and map construction, for example, image processing technologies such as image colorization and image stroke extraction.

The quantity of recognized facial feature points can be set as required, for example, the quantity of recognized facial contour feature points, the quantity of eye feature points, or the like can be set.

For example, referring to FIG. 5A, the facial feature network recognition model is used to perform recognition on the face image, and facial feature points can be obtained. The feature points of facial features can be described by 88 coordinate points, including 21 points for the facial contour, 8 points for the left eye, 8 points for the right eye, 2 points for the pupil, 8 points for the left eyebrow, 8 points for the right eyebrow, 20 points for the mouth, and 13 points for the nose.

Feature point position offset information between the to-be-processed facial feature point and a reference facial feature point is determined, the reference facial feature point being a facial feature point corresponding to a reference face image.

Referring to FIG. 5A, the position offset information between the to-be-processed facial feature point relative to the corresponding reference facial feature point is calculated, and the position offset information includes an offset direction and an offset weight.

In an embodiment, a positioning feature point in the reference face image can be used as a position reference to determine feature point position offset information of the to-be-processed face image relative to the reference face image.

To locate the feature point, the feature point at the tip of the nose can be selected.

Based on the feature point position offset information, position adjustment is performed on a facial feature point of a reference face depth image to obtain a target face depth image corresponding to the to-be-processed face image.

Referring to FIG. 5C, the adjustment may specifically include the following steps:

An offset direction and an offset weight of the to-be-processed facial feature point is determined from the feature point position offset information; and according to the offset direction and the offset weight, position adjustment is performed on the facial feature point in the reference face depth image to obtain the target face depth image corresponding to the to-be-processed face image.

The depth image is drawn according to standard facial anatomy. A position with the shallowest depth to a position with the deepest depth are expressed in white to black, basically covering a nose tip to a coronal line (a visible range of the front of a head), and a color is too gentle and soft.

Referring to FIG. 5A, by recognizing a face of the user, key points of the face and facial features are located, and the feature point position offset information of the reference face image and the to-be-processed face image is transferred to the reference depth image to form a depth image corresponding to the to-be-processed face image, similar to a "depth mask". In this way, "3D" facial reconstruction is simulated without introducing a 3D model and a 3D technology. Therefore, the solution can simply and conveniently deflect a to-be-processed face image to a target direction.

Direction deflection is performed on the to-be-processed face image according to the target face depth image to obtain a target face image.

In an embodiment, referring to FIG. 5B and FIG. 5C, the step may specifically include:

obtaining depth information of each pixel point in the to-be-processed face image according to the target face depth image and a reference depth relationship;

generating a stereoscopic face image corresponding to the to-be-processed face image according to the depth information of each pixel point in the to-be-processed face image;

deflecting the stereoscopic face image to a target direction to obtain a deflected stereoscopic face image; and projecting the deflected stereoscopic face image in a direction of the to-be-processed face image to obtain the target face image.

Referring to FIG. 5B, the reference depth relationship refers to a relationship between a length from the eyebrow to the chin and a generated maximum depth. In this embodiment, a proper depth of the face can be calculated according to a structure of a human head, and the relationship between the generated maximum depths is taken as: generated maximum depth=0.75a, where a is the length from the eyebrow to the chin. The deflected stereoscopic face image is shown in a third picture of FIG. 5C.

Projection refers to casting a shadow of the deflected stereoscopic face image onto a plane that is consistent with a direction of the to-be-processed face image.

The step "obtaining depth information of each pixel point in the to-be-processed face image according to the target face depth image and a reference depth relationship" may include:

determining a depth level of each pixel from the target face depth image;

determining a face depth parameter of the to-be-processed face image according to a depth reference feature point in the to-be-processed facial feature point and the reference depth relationship; and determining, based on the face depth parameter and the depth level of each pixel, the depth information of each pixel point in the to-be-processed face image.

Figure 6A:
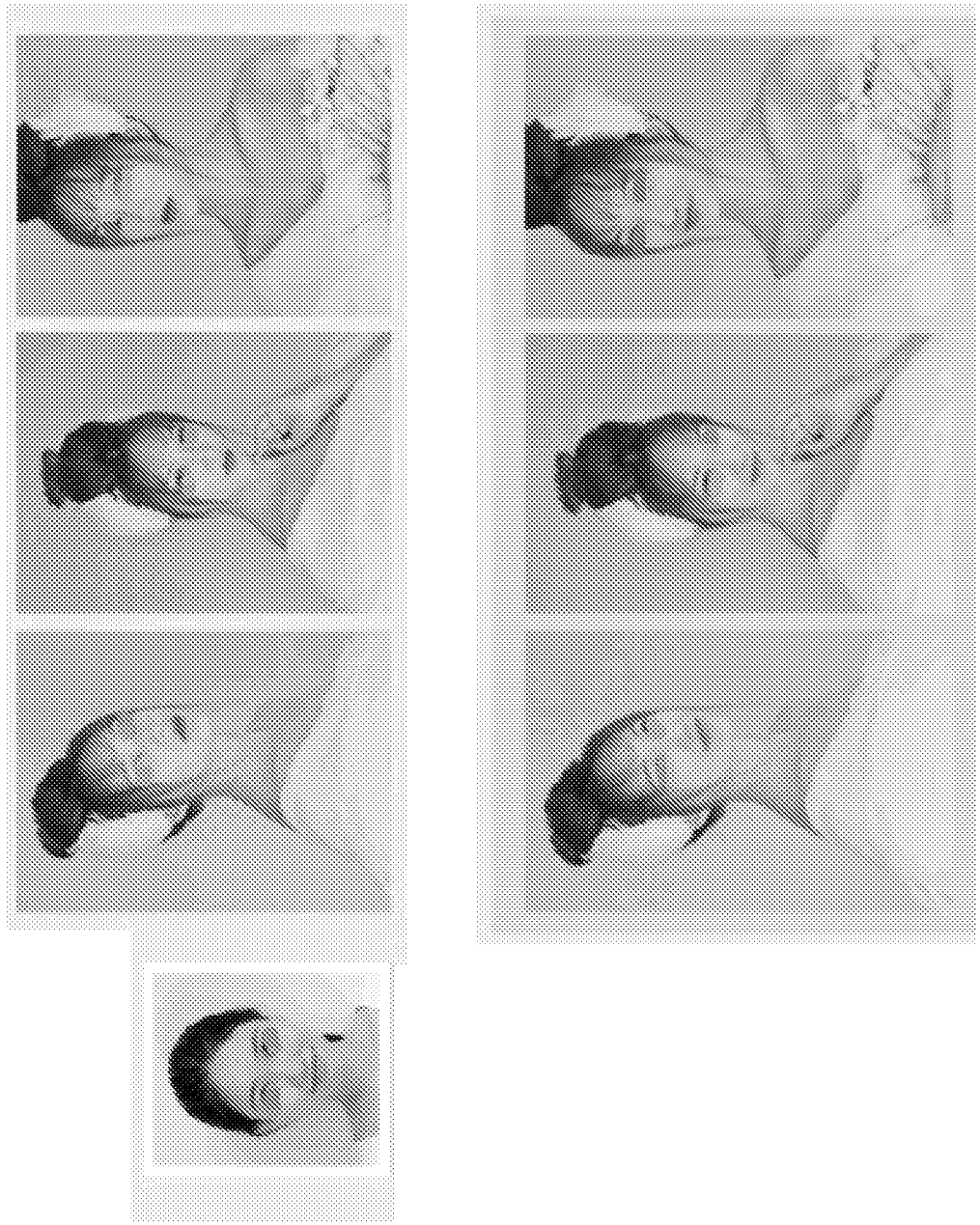
FIG. 6A is a schematic flowchart of a scenario of an image synthesis method according to an embodiment of this application.
Figure 6B:
FIG. 6B is a schematic diagram of a comparison between an image synthesis method according to an embodiment of this application and related art.
Figure 6B:
Figure 6B:
Figure 6C:
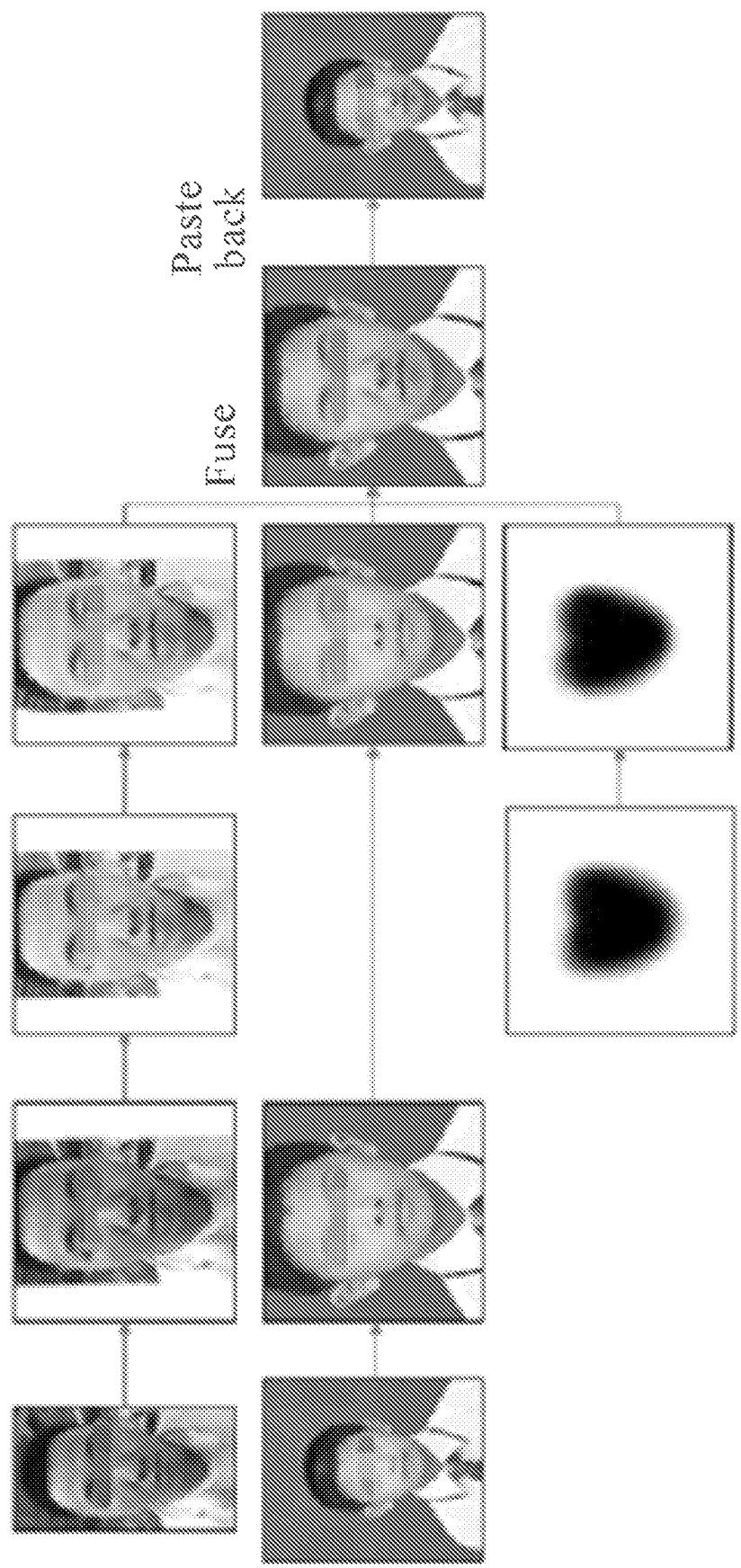
FIG. 6C is a schematic diagram of a fusion process of an image synthesis method according to an embodiment of this application.
Figure 6D:
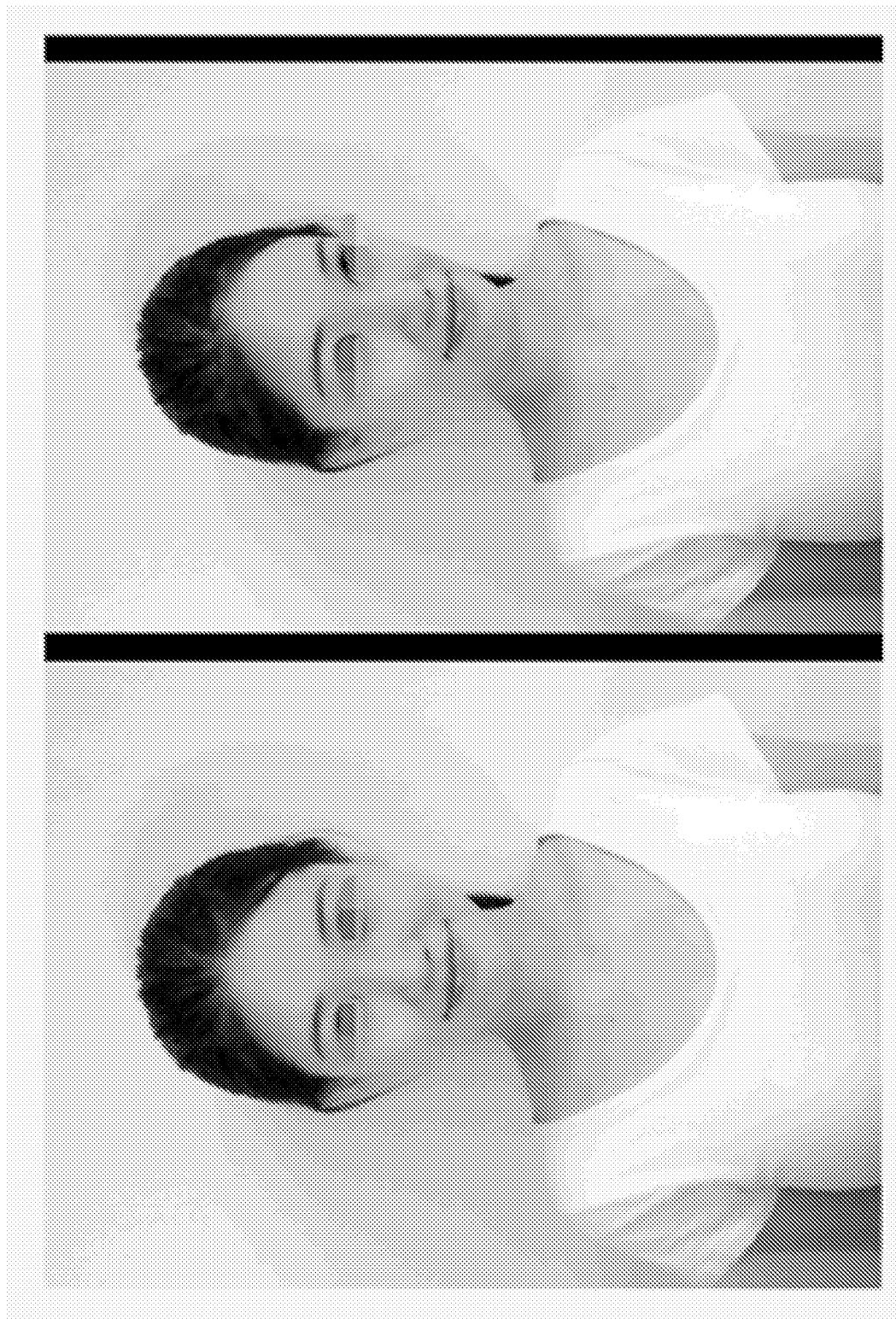
FIG. 6D is a schematic diagram of a synthesis result of an image synthesis method according to an embodiment of this application.

As shown in FIG. 6D, in this embodiment, processing can be performed on a front face image inputted by the user to obtain a face image with a target angle. That is, the solution can simply and conveniently deflect a to-be-processed face image to a target direction.

In an embodiment of this application, the image processing method may be performed according to the following steps:

1) According to a position of the to-be-processed facial feature point, the reference face depth image and a position of the feature point, by means of deformation and stretching, the face depth image that is consistent with the position of the to-be-processed facial feature point is obtained, and center alignment is maintained.

2) A rotation matrix is calculated according to a feature point of the template image and the feature point of the to-be-processed face image.

3) According to the rotation matrix, a position of each pixel point of the original to-be-processed face image is calculated in a rotated image.

4) For a position without pixels after being filled, the nearest neighbor pixel value is filled.

The implementation of these steps is described in detail below:

1) According to a position of a facial feature point of the to-be-processed facial feature point, a basic face depth image and a position of the feature point, by means of deformation and stretching, the face depth image that is consistent with the position of the facial feature point of the to-be-processed facial feature point is obtained, and center alignment is maintained.

The basic face depth image is shown in FIG. 5A, which is a 2D black and white image marked with facial feature points, expressing depth information of different regions on the face. For different users, a face shape and a size are different, so the basic face depth image can be deformed and stretched by means of deformation. Thereby, the effect of being consistent with the position of the facial feature point of the user can be achieved, and then the face depth information of each pixel of the to-be-processed face image can be obtained. An algorithm of this step is consistent with that of a deformation in an original face fusion process. The image below is a depth image for the specific to-be-processed face image after deformation.

2) A rotation matrix is calculated according to a feature point of the template image and the feature point of the to-be-processed face image.

Assuming that a rotation angle is ($\alpha$, $\beta$, $\gamma$), which respectively represents a rotation angle around a coordinate axis (rotation around an x axis, a y axis, and a z axis), then a rotation matrix is:

$$R = R_Z(\alpha)R_y(\beta)R_x(\gamma) =$$

$$\overset{\text{yaw}}{\begin{bmatrix} \cos\alpha & -\sin\alpha & 0 \\ \sin\alpha & \cos\alpha & 0 \\ 0 & 0 & 1 \end{bmatrix}} \overset{\text{pitch}}{\begin{bmatrix} \cos\beta & 0 & \sin\beta \\ 0 & 1 & 0 \\ -\sin\beta & 0 & \cos\beta \end{bmatrix}} \overset{\text{roll}}{\begin{bmatrix} 1 & 0 & 0 \\ 0 & \cos\gamma & -\sin\gamma \\ 0 & \sin\gamma & \cos\gamma \end{bmatrix}}$$

$$R = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

a standard coordinate point rotation formula of a three-dimensional coordinate system.

3) According to the rotation matrix, a position of each pixel point of the original to-be-processed face image is calculated in a rotated image; and pixels are filled.

After a rotation matrix R is obtained, coordinates of each pixel point of the to-be-processed face image after rotation can be calculated in a new image according to the to-be-processed face image, the position of the facial feature point, and the depth image of the face.

Assuming that R={R[0], R[1], R[2],
R[3], R[4], R[5],
R[6], R[7], R[8]}
a coordinate point of the to-be-processed face image is (i, j), and the depth information corresponding to the coordinate point is a pixel depth, then the following formula can be used to calculate a coordinate point (x, y) and a depth z in a rotated image:

int x=ceil(R[0]*(j−center·x)+R[1]*(i−center·y)+R[2]
*pixeldepth+center·x);

int y=ceil(R[3]*(j−center·x)+R[4]*(i−center·y)+R[5]
*pixeldepth+center·y);

float z=R[6]*(j−center·x)+R[7]*(i−center·y)+R[8]
*pixeldepth;

Assuming that there are a plurality of pixels mapped to the same coordinate (x, y) after deflection, a value of a pixel point with a smaller z (closer to the user) is taken as the coordinate (x, y) after deflection.

4) For a position without pixels after being filled, the nearest neighbor pixel value is filled.

The step is to fill missing pixels in the target face image to avoid missing some pixels in the target face image. Filling can be completed with the simplest and nearest neighbor pixels.

A face image processing solution provided in the embodiments of this application can be applied to various face image processing scenarios, for example, an image synthesis scenario.

Figure 6E:
FIG. 6E is a schematic diagram of video synthesis of an image synthesis method according to an embodiment of this application.

Referring to FIG. 6E, according to the image processing method described in the foregoing embodiments, the image synthesis method is further described in detail below.

In this embodiment, the image synthesis method provided in this embodiment of this application is described in detail by using face image processing as an example.

Figure 2B:
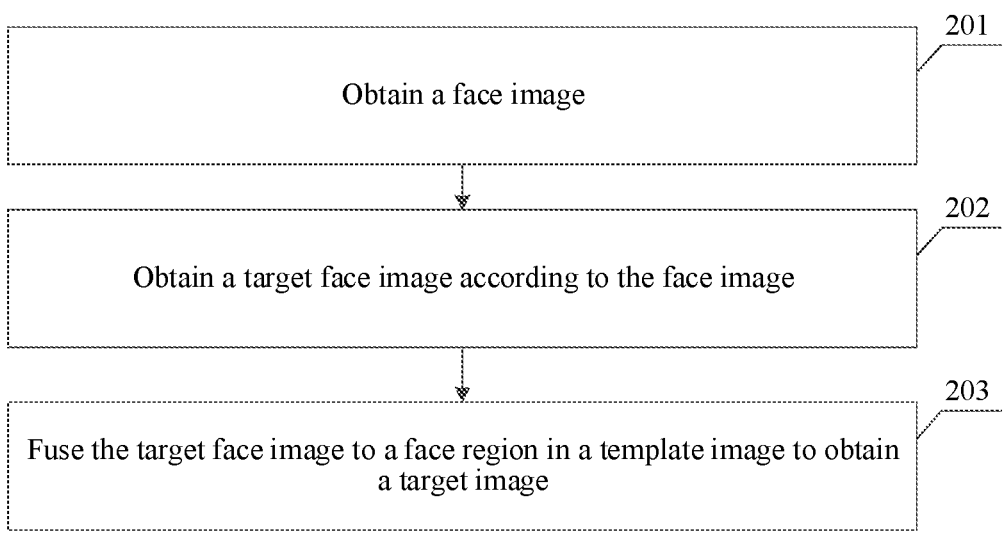
FIG. 2B is a schematic flowchart of an image synthesis method according to an embodiment of this application.
Figure 4:
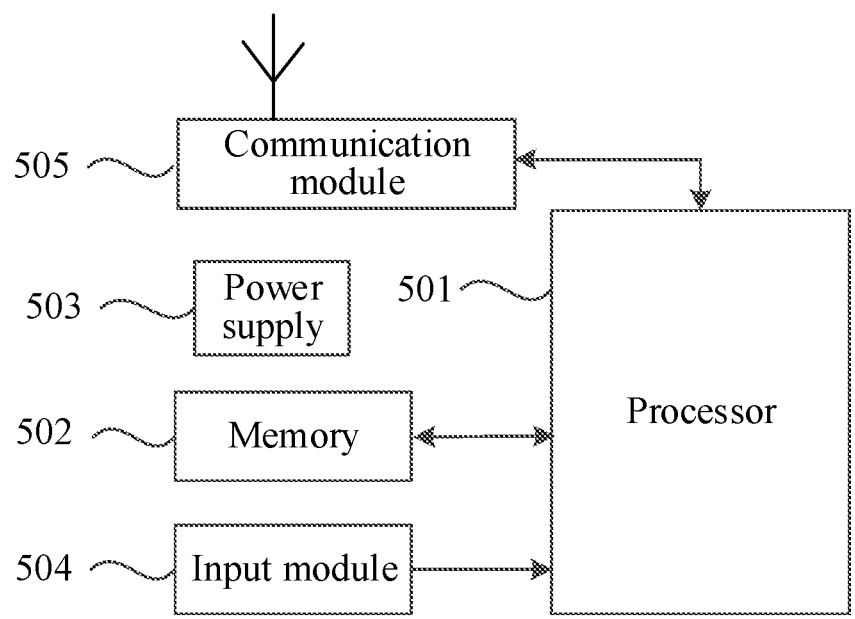
FIG. 4 is a schematic structural diagram of an electronic device according to an embodiment of this application.

As shown in FIG. 2B, an image synthesis method can be performed by the electronic device shown in FIG. 4, and the process is as follows.

A to-be-processed face image is obtained.

In an embodiment, referring to FIG. 6A, before the to-be-processed face image is obtained, the following steps further include:
  when an image template selection operation on a face processing page performed by the user is detected, obtaining a template image selected by the user; and
  determining, based on a direction of a face region in the template image and a direction of the to-be-processed face image, a target deflection angle.

Correspondingly, the deflecting the stereoscopic face image to a target direction to obtain a deflected stereoscopic face image includes:
  deflecting, based on the target deflection angle, the stereoscopic face image to the target direction to obtain the deflected stereoscopic face image.

Referring to FIG. 6A, a first group of images are template images, and a second group of images are target images.

The target face image is obtained according to the to-be-processed face image.

In an embodiment, the target face image can be obtained by using the method in the first embodiment.

In another embodiment, a depth camera disposed on the terminal can further be used to capture a stereoscopic image of the face of the user, which can include the following steps:
  obtaining depth information of each pixel point in the to-be-processed face image;
  generating a stereoscopic face image corresponding to the to-be-processed face image according to the depth information of each pixel point;
  deflecting the stereoscopic face image to a target direction to obtain a deflected stereoscopic face image; and
  projecting the deflected stereoscopic face image in a direction of the to-be-processed face image to obtain the target face image.

In an embodiment, the target face image is obtained according to a Normalized Coordinate Code (NCC) corresponding to a reference image, where the NCC can restore the face more abundantly in three-dimensional expression (for example, information such as the inward nostrils, but as far as the accuracy of a synthetic photo is concerned, such detail can be saved). The NCC is equivalent to an initialization model of 3DMM facial reconstruction, also through recognition and transfer of facial points, a mask PNCC with full-angle normal information can be created for the user.

In an embodiment, a mature 3DMM facial reconstruction technology or interface can further be chosen to quickly obtain a 3D model and texture of the face of the user after facial reconstruction, shaping, and expression restoration, and the 3D model is rotated and used in 3D coordinates.

In an embodiment, the user can further be guided to 360° continuously shoot to efficiently provide multi-angle images. For example, through initial positioning of the front and linkage positioning of a camera gyroscope, the user is guided to circle a mobile phone in an arc, and portraits from the main angles of the face of the user are shot (similar to an interaction of iOS and FaceID to record facial information of the user for the first time). If a photo is shot every 50, 16 to 48 consecutive selfies can cover most of the frontal facial angles. The following steps may be included:
  obtaining a plurality of to-be-processed images of the face region within a preset direction range;
  generating a stereoscopic face image according to the plurality of to-be-processed images;
  deflecting the stereoscopic face image to a target direction to obtain a deflected stereoscopic face image; and
  projecting the deflected stereoscopic face image in a direction of the to-be-processed face image to obtain the target face image.

203. Fuse the target face image to a face region in a template image to obtain a target image.

In an embodiment, the step "fusing the target face image to a face region in a template image to obtain a target image" may include:
  performing feature point recognition on the target face image to obtain a target facial feature point;
  fusing, based on the target facial feature point and a corresponding template facial feature point, the target face image and a face region of the template image to obtain a synthetic face region, and a target facial feature point, where the template facial feature point is a facial feature point of the template image; and
  synthesizing the synthetic face region with other regions in the template image to obtain the target image.

In an embodiment, the step "fusing, based on the target facial feature point and a corresponding template facial feature point, the target face image and the face region of the template image to obtain a synthetic face region" may include:
  determining a central region and a circumferential region from the target face image;
  fusing, based on a to-be-processed facial feature point and the corresponding template facial feature point, the central region and a corresponding central region in the template image with a first weight;
  fusing, based on the to-be-processed facial feature point and the corresponding template facial feature point, the circumferential region and a corresponding circumferential region in the template image with a second weight, where the first weight is greater than the second weight; and
  referring to FIG. 6C, obtaining the fused image as a synthetic face region.

The central region refers to a region where the facial features are located, a central region of the reference image refers to a black heart-shaped region, and the circumferential region refers to a region of the face except the central region.

In an embodiment, referring to FIG. 6C, the following steps can be used for fusion:
  1. Facial features positioning: existing facial recognition and facial features positioning algorithms are used.
  2. Cropping and correcting. A face region of the target face image and a face region of the template image are respectively cut out, and it is ensured that the cropped image is square, the tip of the nose is centered, and the face is vertical in a y direction.
3. The color of a skin color region of the target face image is adjusted to enable the fused color to be more natural.
4. The target face image, template image, and a mask map are deformed and adjusted according to a target face point. In the step, deformation is performed by means of a triangular fit.
5. The deformed target face image and template image are superimposed, and a degree of superposition is controlled by using the mask map (for example, in FIG. 6C, a black region (central region) uses more target face image weights, and a white region (circumferential region) uses more template image weights).
6. The obtained synthetic face region is pasted back into the template image to obtain a final result, that is, the target image.

It can be seen from the above that in this application, the face image uploaded by the user can be fused with the template image in different directions. Referring to FIG. 6B, compared with a manner of directly fusing an image inputted by the user with the template image, the image synthesis effect in this embodiment of this application is more natural. That is, the user only needs to upload one face image, and then a plurality of face images from different angles can be generated, thereby improving the playability and practicability of image synthesis.

Figure 5E:
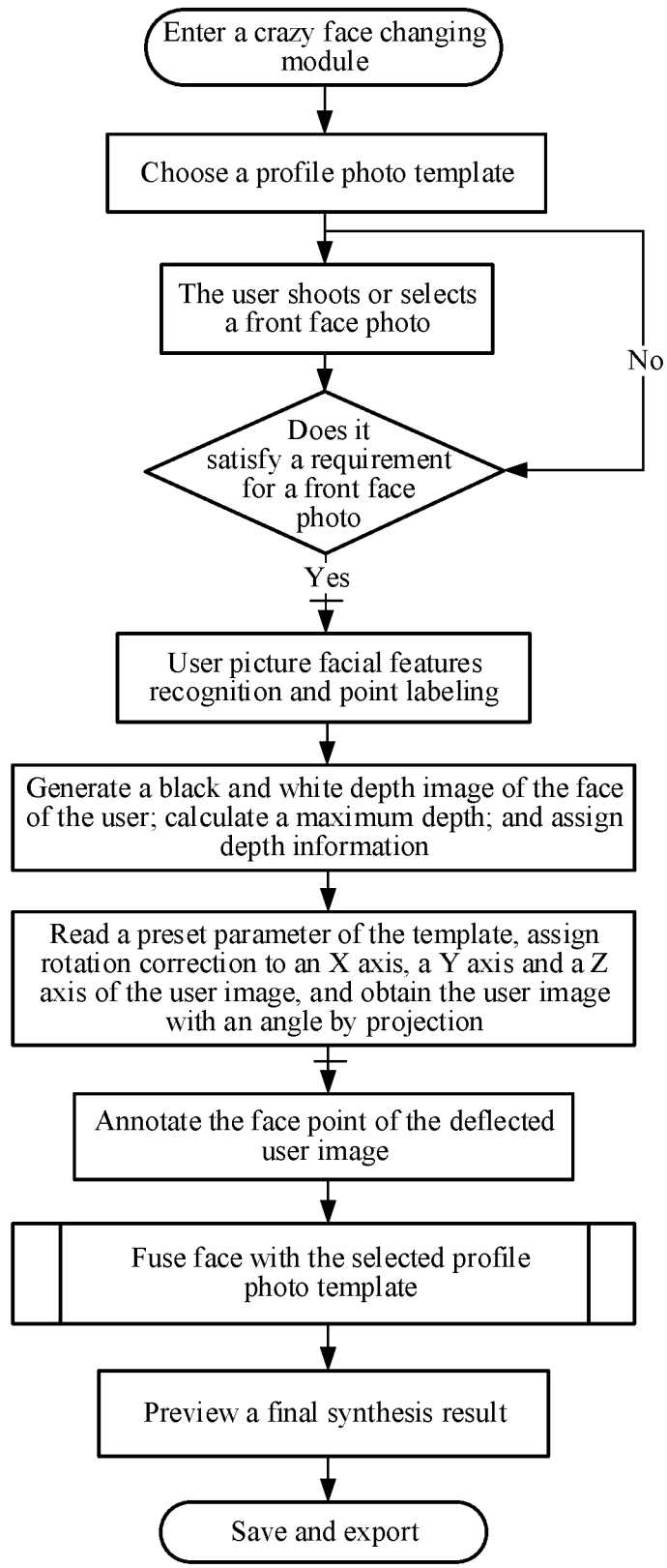
FIG. 5E is an overall schematic flowchart of an image synthesis method according to an embodiment of this application.

As shown in FIG. 5E, the image synthesis method can be applied to a crazy face-changing function of a photo-retouching application.

Referring to FIG. 6E, in addition to synthesizing images with a plurality of angles (such as portraits), the technical solution can also be applied to dynamic or video image synthesis functions with an angle changing process. With only a front face image, the user can obtain a dynamic result of continuous steering by using simple image synthesis, allowing a product to have more gameplay expansion. (The implementation logic is simpler than a GAN generative adversarial network model, and does not require server resources.)

To implement the foregoing method better, this embodiment of this application further provides an image processing apparatus, the image processing apparatus may be integrated in an electronic device, and the electronic device may be a terminal, a server, or the like. The terminal may be a device such as a mobile phone, a tablet computer, an intelligent Bluetooth device, a notebook computer, or a personal computer (PC); and the server may be a single server or a server cluster including a plurality of servers.

For example, in this embodiment, the method of this embodiment of this application is described in detail by using the image processing apparatus integrated into the electronic device as an example.

Figure 3A:
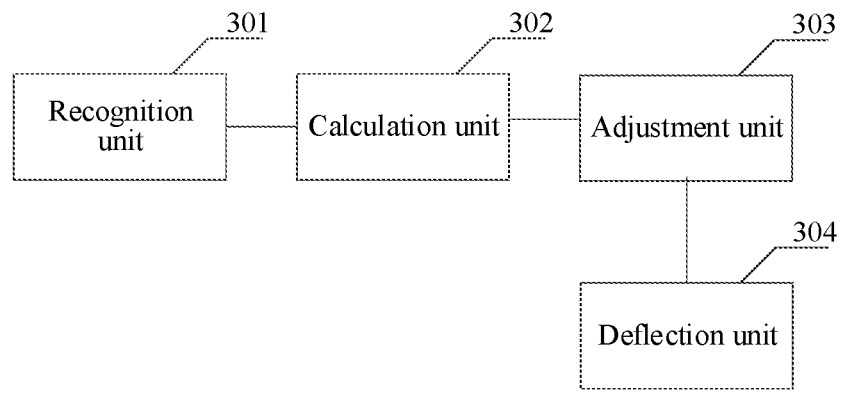
FIG. 3A is a schematic structural diagram of an image processing apparatus according to an embodiment of this application.

For example, as shown in FIG. 3A, the image processing apparatus may include a recognition unit 301, a calculation unit 302, an adjustment unit 303, and a deflection unit 304, as follows:
1. The recognition unit 301 is configured to perform feature point recognition on a face image to obtain a plurality of facial feature points of the face image;
2. the calculation unit 201 is configured to determine feature point position offset information between the facial feature points and a plurality of reference facial feature points of a reference face image;
3. the adjustment unit 303 is configured to perform, based on the feature point position offset information, position adjustment on a facial feature point of a reference face depth image to obtain a target face depth image corresponding to the to-be-processed face image, the reference face depth image being a face depth image corresponding to the reference face image; and
4. the deflection unit 304 is configured to perform direction deflection on the to-be-processed face image according to the target face depth image to obtain a target face image.

The deflection unit 304 may include an obtaining subunit, a generation subunit, a deflection subunit, and a projection subunit, as follows:

The obtaining subunit is configured to obtain depth information of each pixel point in the to-be-processed face image according to the target face depth image and a reference depth relationship;
the generation subunit is configured to generate a stereoscopic face image corresponding to the to-be-processed face image according to the depth information of each pixel point in the to-be-processed face image;
the deflection subunit is configured to deflect the stereoscopic face image to a target direction to obtain a deflected stereoscopic face image; and
the projection subunit is configured to project the deflected stereoscopic face image in a direction of the to-be-processed face image to obtain the target face image.

The obtaining subunit is further configured to:
determine a depth level of each pixel from the target face depth image;
determine a face depth parameter of the to-be-processed face image according to a depth reference feature point in the to-be-processed facial feature point and the reference depth relationship; and
determine, based on the face depth parameter and the depth level of each pixel, the depth information of each pixel point in the to-be-processed face image.

The calculation unit 302 is further configured to:
use a positioning feature point in the reference face image as a position reference to determine feature point position offset information of the to-be-processed face image relative to the reference face image.

The adjustment unit 303 is configured to:
determine an offset direction and an offset weight of the to-be-processed facial feature point from the feature point position offset information; and
perform, according to the offset direction and the offset weight, position adjustment on the facial feature point in the reference face depth image to obtain the target face depth image corresponding to the to-be-processed face image.

To implement the foregoing method better, this embodiment of this application further provides an image synthesis apparatus, the image synthesis apparatus may be integrated in an electronic device, and the electronic device may be a terminal, a server, or the like. The terminal may be a device such as a mobile phone, a tablet computer, an intelligent Bluetooth device, a notebook computer, a personal computer (PC) or the like; and the server may be a single server or a server cluster including a plurality of servers.

For example, in this embodiment, the method of this embodiment of this application is described in detail by using the image synthesis apparatus integrated into the electronic device as an example.

Figure 3B:
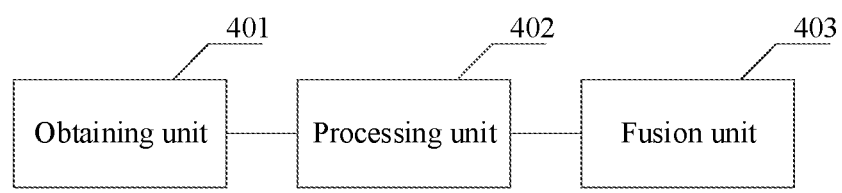
FIG. 3B is a schematic structural diagram of an image synthesis apparatus according to an embodiment of this application.

For example, as shown in FIG. 3B, the image synthesis apparatus may include an obtaining unit 401, a processing unit 402, and a fusion unit 403 as follows:

1. The obtaining unit is configured to obtain a to-be-processed face image;
2. the processing unit is configured to obtain a target face image according to the face image, the target face image being obtained by processing of the image processing method according to the foregoing embodiments of this application; and
3. a fusion unit is configured to fuse the target face image to a face region in a template image to obtain a target image.

In an embodiment, the image synthesis apparatus further comprises a first synthesis unit, being configured to:
  obtain depth information of each pixel point in the to-be-processed face image;
  generate a stereoscopic face image corresponding to the to-be-processed face image according to the depth information of each pixel point;
  deflect the stereoscopic face image to a target direction to obtain a deflected stereoscopic face image; and
  project the deflected stereoscopic face image in a direction of the to-be-processed face image to obtain the target face image.

In an embodiment, the image synthesis apparatus further includes a second synthesis unit, being configured to:
  obtain a plurality of to-be-processed images of the face region within a preset direction range;
  generate a stereoscopic face image according to the plurality of to-be-processed images;
  deflect the stereoscopic face image to a target direction to obtain a deflected stereoscopic face image; and
  project the deflected stereoscopic face image in a direction of the to-be-processed face image to obtain the target face image.

The obtaining unit 401 is configured to:
  obtain a to-be-processed image; and
  when a direction of a face region in the to-be-processed image is a preset direction, divide the face region from the to-be-processed image as the to-be-processed face image, where the preset direction is a direction where the face region is located in a reference face image.

The fusion unit 403 may include a recognition subunit, a fusion subunit, and a synthesis subunit, as follows:

The recognition subunit is configured to perform feature point recognition on the target face image to obtain a target facial feature point;
  the fusion subunit fuse is configured to fuse, based on the target facial feature point and a corresponding template facial feature point, the target face image and a face region of the template image to obtain a synthetic face region, and a target facial feature point, where the template facial feature point is a facial feature point of the template image; and
  the synthesis subunit is configured to synthesize the synthetic face region with other regions in the template image to obtain the target image.

The fusion subunit is configured to:
  determine a central region and a circumferential region from the target face image;
  fuse, based on a to-be-processed facial feature point and the corresponding template facial feature point, the central region and a corresponding central region in the template image with a first weight;
  fuse, based on the to-be-processed facial feature point and the corresponding template facial feature point, the circumferential region and a corresponding circumferential region in the template image with a second weight; where the first weight is greater than the second weight; and
  obtain the fused image as the synthetic face region.

The foregoing units may be implemented as independent entities, or may be combined arbitrarily and implemented as the same entity or a plurality of entities. For specific implementation of the foregoing units, reference can be made to the foregoing method embodiments, so the details are not described herein again.

The embodiments of this application further provide an electronic device, and the electronic device may be a terminal, a server, or the like. The terminal may be a mobile phone, a tablet computer, an intelligent Bluetooth device, a notebook computer, a personal computer (PC) or the like; and the server may be a single server or a server cluster including a plurality of servers.

In some embodiments, the image processing apparatus or image synthesis apparatus may further be integrated into a plurality of electronic devices. For example, the image processing apparatus may be integrated into a plurality of servers, and the image processing method of this application may be implemented by a plurality of servers. In some embodiments, a face image processing server and a face image synthesis server may also be implemented by one server.

In this embodiment, an electronic device of this embodiment is described in detail. For example, FIG. 4 is a schematic structural diagram of an electronic device according to an embodiment of this application.

The electronic device may include components such as one or more processors 501 serving as processing cores, one or more memories 502, a power supply 503, an input module 504, and a communication module 505. The memory 502 may be a computer-readable storage medium. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 501 is a control location of the electronic device, and connects various parts of the entire electronic device by using various interfaces and lines. By running or executing a software program and/or a module stored in the memory 502, and invoking data stored in the memory 502, the processor performs various functions of the electronic device and processes data, thereby performing overall monitoring on the electronic device. In some embodiments, the processor 501 may include one or more processing cores. In some embodiments, the processor 501 may integrate an application processor and a modem. The application processor mainly processes an operating system, a user interface, an application program, and the like. The modem mainly processes wireless communication. It may be understood that the foregoing modem may either not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, an application program required by at least one function (for example, a sound playback function and an image playback function), or the like. The data storage area may store data created according to use of the electronic device. In addition, the memory 502 may include a high speed random access memory, and may also include a non-volatile memory, such as at least one magnetic disk storage device, a flash memory, or another volatile solid-state storage device. Correspondingly, the memory 502 may further include a memory controller, to provide access of the processor 501 to the memory 502.

The electronic device further includes the power supply 503 for supplying power to the components. In some embodiments, the power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other components.

The electronic device may further include an input module 504. The input module 504 may be configured to receive inputted digit or character information, and generate a keyboard, mouse, joystick, optical or track ball signal input related to the user setting and function control.

The electronic device may further include the communication module 505. In some embodiments, the communication module 505 may include a wireless module. The electronic device may perform a short distance wireless transmission through the wireless module of the communication module 505, to provide wireless broadband Internet access for the user. For example, the communication module 505 may be configured to help a user to receive and send an email, browse a web page, access streaming media, and the like.

Although not shown in the figure, the electronic device may further include a display unit, and the like. Details are not described herein again. In this embodiment, the processor 501 in the electronic device may load executable files corresponding to processes of one or more application programs to the memory 502 according to the following instructions, and the processor 501 runs the application program stored in the memory 502, to implement various functions as follows:

Feature point recognition is performed on the face image to obtain a plurality of facial feature points;
  feature point position offset information between the to-be-processed facial feature point and a reference facial feature point is determined, the reference facial feature point being a facial feature point corresponding to a reference face image;
  based on the feature point position offset information, position adjustment is performed on a facial feature point of a reference face depth image to obtain a target face depth image corresponding to the to-be-processed face image, the reference face depth image being a face depth image corresponding to the reference face image; and
  direction deflection is performed on the to-be-processed face image according to the target face depth image to obtain a target face image.
Or,
a to-be-processed face image is obtained;
a target face image is obtained according to the to-be-processed face image, the target face image being obtained by processing of the image processing method; and
  the target face image is fused to a face region in a template image to obtain a target image.

For specific implementation of the foregoing operations, reference may be made to the foregoing embodiments. Details are not described herein again.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

According to an aspect of this application, a computer program product or a computer program is provided, the computer program product or the computer program including computer instructions, the computer instructions being stored in a computer-readable storage medium. A processor of an electronic device reads the computer instructions from the computer-readable storage medium, and executes the computer instructions, to cause the electronic device to perform the image processing method or the image synthesis method described in the foregoing embodiments.

Accordingly, an embodiment of this application provides a computer-readable storage medium which stores a plurality of instructions. The instructions can be loaded by the processor, to perform the steps in any image processing method according to the embodiments of this application. For example, the instructions may perform the following steps:

Feature point recognition is performed on the face image to obtain a plurality of facial feature points;
  feature point position offset information between the to-be-processed facial feature point and a reference facial feature point is determined, the reference facial feature point being a facial feature point corresponding to a reference face image;
  based on the feature point position offset information, position adjustment is performed on a facial feature point of a reference face depth image to obtain a target face depth image corresponding to the to-be-processed face image, the reference face depth image being a face depth image corresponding to the reference face image; and
  direction deflection is performed on the to-be-processed face image according to the target face depth image to obtain a target face image.
Or,
a to-be-processed face image is obtained.
a target face image is obtained according to the to-be-processed face image, the target face image being obtained by processing of the image processing method; and
  the target face image is fused to a face region in a template image to obtain a target image.

The computer-readable storage medium may include: a read-only memory (ROM), a random access memory (RAM), a magnetic disk, an optical disc, or the like.

Because the instructions stored in the computer-readable storage medium may perform the steps of any image processing method or image synthesis method provided in the embodiments of this application, the instructions can implement beneficial effects that can be implemented by any image processing method or image synthesis method provided in the embodiments of this application. For details, reference may be made to the foregoing embodiments. Details are not described herein again.

The method and apparatus for image processing and face synthesis, and the computer-readable storage medium provided in the embodiments of this application are described in detail above. The principle and implementations of this application are described herein by using specific examples in this specification. The descriptions of the foregoing embodiments are merely intended to help understand the method and the core idea of this application. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In addition, a person skilled in the art may make modifications to the specific implementations and the application range according to the ideas of this application. In conclusion, the content of this specification shall not be construed as a limitation to this application.

What is claimed is:

1. An image processing method performed by a computer device, the method comprising:
    performing feature point recognition on a face image to obtain a plurality of facial feature points of the face image;
    determining feature point position offset information between the plurality of facial feature points and a plurality of reference facial feature points of a reference face image;
    performing, based on the feature point position offset information, position adjustment on a facial feature point of a reference face depth image to obtain a target face depth image corresponding to the face image, the reference face depth image being a face depth image corresponding to the reference face image; and
    performing direction deflection on the face image according to the target face depth image to obtain a target face image.

2. The image processing method according to claim 1, wherein the performing direction deflection on the face image according to the target face depth image to obtain a target face image comprises:
    obtaining depth information of each pixel point in the face image according to the target face depth image and a reference depth relationship;
    generating a stereoscopic face image corresponding to the face image according to the depth information of each pixel point in the face image;
    deflecting the stereoscopic face image to a target direction to obtain a deflected stereoscopic face image; and
    projecting the deflected stereoscopic face image in a direction of the face image to obtain the target face image.

3. The image processing method according to claim 2, wherein the obtaining depth information of each pixel point in the face image according to the target face depth image and a reference depth relationship comprises:
    determining a depth level of each pixel from the target face depth image;
    determining a face depth parameter of the face image according to a depth reference feature point in the plurality of facial feature points and the reference depth relationship; and
    determining, based on the face depth parameter and the depth level of each pixel, the depth information of each pixel point in the face image.

4. The image processing method according to claim 1, wherein the determining feature point position offset information between the plurality of facial feature points and a plurality of reference facial feature points comprises:
    using a positioning feature point in the reference face image as a position reference to determine feature point position offset information of the face image relative to the reference face image.

5. The image processing method according to claim 1, wherein the performing, based on the feature point position offset information, position adjustment on a facial feature point of a reference face depth image to obtain a target face depth image corresponding to the face image comprises:
    determining an offset direction and an offset weight of the plurality of facial feature points from the feature point position offset information; and
    performing, according to the offset direction and the offset weight, the position adjustment on the facial feature point in the reference face depth image to obtain the target face depth image corresponding to the face image.

6. The image processing method according to claim 1, the method comprising:
    fusing the target face image to a face region in a template image to obtain a target image.

7. The image processing method according to claim 6, wherein the fusing the target face image to a face region in a template image to obtain a target image comprises:
    performing feature point recognition on the target face image to obtain a target facial feature point;
    fusing, based on the target facial feature point and a corresponding template facial feature point, the target face image and the face region of the template image to obtain a synthetic face region, the template facial feature point being a facial feature point of the template image; and
    synthesizing the synthetic face region with other regions in the template image to obtain the target image.

8. The image processing method according to claim 7, wherein the fusing, based on the target facial feature point and a corresponding template facial feature point, the target face image and the face region of the template image to obtain a synthetic face region comprises:
    determining a central region and a circumferential region from the target face image;
    fusing, based on a plurality of facial feature points and the corresponding template facial feature point, the central region and a corresponding central region in the template image with a first weight;
    fusing, based on the plurality of facial feature points and the corresponding template facial feature point, the circumferential region and a corresponding circumferential region in the template image with a second weight, the first weight being greater than the second weight; and
    obtaining the fused image as the synthetic face region.

9. A computer device, comprising a processor and a memory,
    the memory being configured to store a plurality of instructions, and the processor being configured to execute the plurality of instructions to perform an image processing method including:

performing feature point recognition on a face image to obtain a plurality of facial feature points of the face image;

determining feature point position offset information between the plurality of facial feature points and a plurality of reference facial feature points of a reference face image;

performing, based on the feature point position offset information, position adjustment on a facial feature point of a reference face depth image to obtain a target face depth image corresponding to the face image, the reference face depth image being a face depth image corresponding to the reference face image; and performing direction deflection on the face image according to the target face depth image to obtain a target face image.

10. The computer device according to claim 9, wherein the performing direction deflection on the face image according to the target face depth image to obtain a target face image comprises:

obtaining depth information of each pixel point in the face image according to the target face depth image and a reference depth relationship;

generating a stereoscopic face image corresponding to the face image according to the depth information of each pixel point in the face image;

deflecting the stereoscopic face image to a target direction to obtain a deflected stereoscopic face image; and projecting the deflected stereoscopic face image in a direction of the face image to obtain the target face image.

11. The computer device according to claim 10, wherein the obtaining depth information of each pixel point in the face image according to the target face depth image and a reference depth relationship comprises:

determining a depth level of each pixel from the target face depth image;

determining a face depth parameter of the face image according to a depth reference feature point in the plurality of facial feature points and the reference depth relationship; and determining, based on the face depth parameter and the depth level of each pixel, the depth information of each pixel point in the face image.

12. The computer device according to claim 9, wherein the determining feature point position offset information between the plurality of facial feature points and a plurality of reference facial feature points comprises:

using a positioning feature point in the reference face image as a position reference to determine feature point position offset information of the face image relative to the reference face image.

13. The computer device according to claim 9, wherein the performing, based on the feature point position offset information, position adjustment on a facial feature point of a reference face depth image to obtain a target face depth image corresponding to the face image comprises:

determining an offset direction and an offset weight of the plurality of facial feature points from the feature point position offset information; and performing, according to the offset direction and the offset weight, the position adjustment on the facial feature point in the reference face depth image to obtain the target face depth image corresponding to the face image.

14. The computer device according to claim 9, wherein the method further comprises:

fusing the target face image to a face region in a template image to obtain a target image.

15. The computer device according to claim 14, wherein the fusing the target face image to a face region in a template image to obtain a target image comprises:

performing feature point recognition on the target face image to obtain a target facial feature point;

fusing, based on the target facial feature point and a corresponding template facial feature point, the target face image and the face region of the template image to obtain a synthetic face region, the template facial feature point being a facial feature point of the template image; and synthesizing the synthetic face region with other regions in the template image to obtain the target image.

16. The computer device according to claim 15, wherein the fusing, based on the target facial feature point and a corresponding template facial feature point, the target face image and the face region of the template image to obtain a synthetic face region comprises:

determining a central region and a circumferential region from the target face image;

fusing, based on a plurality of facial feature points and the corresponding template facial feature point, the central region and a corresponding central region in the template image with a first weight;

fusing, based on the plurality of facial feature points and the corresponding template facial feature point, the circumferential region and a corresponding circumferential region in the template image with a second weight, the first weight being greater than the second weight; and obtaining the fused image as the synthetic face region.

17. A non-transitory computer-readable storage medium, storing a plurality of instructions, the instructions, when executed by a processor of a computer device, causing the computer device to perform an image processing method including:

performing feature point recognition on a face image to obtain a plurality of facial feature points of the face image;

determining feature point position offset information between the plurality of facial feature points and a plurality of reference facial feature points of a reference face image;

performing, based on the feature point position offset information, position adjustment on a facial feature point of a reference face depth image to obtain a target face depth image corresponding to the face image, the reference face depth image being a face depth image corresponding to the reference face image; and performing direction deflection on the face image according to the target face depth image to obtain a target face image.

18. The non-transitory computer-readable storage medium according to claim 17, wherein the performing direction deflection on the face image according to the target face depth image to obtain a target face image comprises:

obtaining depth information of each pixel point in the face image according to the target face depth image and a reference depth relationship;

generating a stereoscopic face image corresponding to the face image according to the depth information of each pixel point in the face image;

deflecting the stereoscopic face image to a target direction to obtain a deflected stereoscopic face image; and projecting the deflected stereoscopic face image in a direction of the face image to obtain the target face image.

19. The non-transitory computer-readable storage medium according to claim 17, wherein the determining feature point position offset information between the plurality of facial feature points and a plurality of reference facial feature points comprises:
using a positioning feature point in the reference face image as a position reference to determine feature point position offset information of the face image relative to the reference face image.

20. The non-transitory computer-readable storage medium according to claim 17, wherein the performing, based on the feature point position offset information, position adjustment on a facial feature point of a reference face depth image to obtain a target face depth image corresponding to the face image comprises:
determining an offset direction and an offset weight of the plurality of facial feature points from the feature point position offset information; and
performing, according to the offset direction and the offset weight, the position adjustment on the facial feature point in the reference face depth image to obtain the target face depth image corresponding to the face image.

* * * * *